(12) United States Patent
Isozaki

(10) Patent No.: US 7,122,731 B2
(45) Date of Patent: Oct. 17, 2006

(54) MUSICAL INFORMATION PROCESSING TERMINAL, CONTROL METHOD THEREFOR, AND PROGRAM FOR IMPLEMENTING THE METHOD

(75) Inventor: Yoshimasa Isozaki, Shizuoka-ken (JP)

(73) Assignee: Yamaha Corporation, Shizuoka-ken (JP)

( * ) Notice: Subject to any disclaimer, the term of this patent is extended or adjusted under 35 U.S.C. 154(b) by 234 days.

(21) Appl. No.: 10/379,970

(22) Filed: Mar. 5, 2003

(65) Prior Publication Data
US 2003/0167906 A1 Sep. 11, 2003

(30) Foreign Application Priority Data
Mar. 6, 2002 (JP) .............................. 2002-059610

(51) Int. Cl.
*G10H 1/18* (2006.01)
(52) U.S. Cl. .......................... 84/615; 84/601; 84/645; 84/653
(58) Field of Classification Search .......... 84/600–602, 84/609–610, 615, 645, 649–650, 653
See application file for complete search history.

(56) References Cited

U.S. PATENT DOCUMENTS

| | | | | |
|---|---|---|---|---|
| 6,143,973 | A * | 11/2000 | Kikuchi | 84/645 |
| 6,271,455 | B1 * | 8/2001 | Ishigaki et al. | 84/605 |
| 6,806,412 | B1 * | 10/2004 | Fay | 84/645 |
| 6,815,601 | B1 * | 11/2004 | Yano | 84/655 |
| 2002/0121181 | A1 * | 9/2002 | Fay et al. | 84/609 |
| 2003/0075036 | A1 * | 4/2003 | Isozaki et al. | 84/602 |
| 2004/0094020 | A1 * | 5/2004 | Wang et al. | 84/622 |

FOREIGN PATENT DOCUMENTS

| | | |
|---|---|---|
| JP | 11.-190993 | 7/1999 |
| JP | 2000-156049 | 6/2000 |

OTHER PUBLICATIONS

Japanese Office Action dated Nov. 22, 2005.
Office Action Issued in JP application 2002-059610, no date.

* cited by examiner

*Primary Examiner*—Marlon Fletcher
(74) *Attorney, Agent, or Firm*—Harness, Dickey & Pierce, P.L.L.C.

(57) ABSTRACT

There is provided a musical information processing terminal that enables reproducing performance data and audio data that are transmitted and received between the musical information processing terminal such as a terminal for a teacher and a terminal for students through a communication network with a simple construction and without an unnatural feeling being given to users. At least one of performance data that instructs generation and control of musical tones and audio data that represents audio waveforms is received from an external musical information processing terminal through a communication network. The performance data or the audio data is reproduced. Data to be reproduced is selected either from the performance data or from the audio data. The data to be reproduced is determined according to the received data and the selected data.

14 Claims, 6 Drawing Sheets

MUSICAL INFORMATION PROCESSING TERMINAL, CONTROL METHOD THEREFOR, AND PROGRAM FOR IMPLEMENTING THE METHOD

BACKGROUND OF THE INVENTION

1. Field of the Invention

The present invention relates to a musical information processing terminal for reproducing musical information which is transmitted and received in a musical lesson or the like performed through a communication network, a control method for controlling the musical information processing terminal, and a program for implementing the control method.

2. Description of the Related Art

In a musical classroom where musical lessons are performed through a communication network, there are used a terminal for a teacher which is provided with an electronic musical instrument and a microphone. When a teacher plays the electronic musical instrument, performance data in the MIDI format (MIDI data) is generated by the teacher playing the electronic musical instrument, and when the teacher speak to give comments or musical instructions, his speech is picked up by the microphone to generate audio data. Each time such MIDI data and audio data are generated, the MIDI data and the audio data are transmitted from the terminal for the teacher to a plurality of terminals for students. On the other hand, the plurality of terminals for students are each provided with a reproducing device that reproduces MIDI data and audio data from the electronic musical instrument and the microphone of the terminal for the teacher. The reproducing device reproduces MIDI data and audio data received from the terminal for the teacher in order in which they are received.

In this system, on the side of the terminal for the teacher, the teacher's performance using the electronic musical instrument not only generates MIDI data from the electronic musical instrument but also generates actual sounds of the electronic musical instrument which are input to the microphone. Thus, the actual sounds of the electronic musical instrument are contained in the audio data transmitted from the terminal for the teacher to the terminals for students. However, there occurs a delay in reproduction of the audio data relative to reproduction of the MIDI data due to a difference in transmission time and reproduction processing time between the two kinds of data. Therefore, if the MIDI data and the audio data are reproduced in the order in which they are received, the reproduction sound of the MIDI data and the reproduction sound of the audio data are slightly shifted in timing so that they overlap each other, resulting in overlapping reproduction like round singing.

One way to avoid such shifting is, for example, that the reproduction of the MIDI data is delayed by an amount corresponding to the reproduction delay time of the audio data so as to reproduce the two kinds of data in synchronism with each other. However, such synchronized reproduction is technically difficult to perform, and it is particularly difficult to eliminate the shifting for all the plurality of terminals for students.

SUMMARY OF THE INVENTION

It is an object of the present invention to provide a musical information processing terminal and a control method for controlling the same that enable reproducing performance data and audio data that are transmitted and received between the musical information processing terminal such as a terminal for a teacher and a musical information processing terminal such as terminals for students through a communication network with a simple construction and without an unnatural feeling being given to users, and a control method for controlling the musical information processing terminal, and a program for implementing the control method.

To attain the above object, in a first aspect of the present invention, there is provided musical information processing terminal comprising a receiving device that receives at least one of performance data that instructs generation and control of musical tones and audio data that represents audio waveforms, from an external musical information processing terminal through the communication network, a reproducing device that reproduces the performance data or the audio data, and a selecting device that selects data to be reproduced by the reproducing device either from the performance data or from the audio data, wherein the data to be reproduced by the reproducing device is determined according to the data received by the receiving device and the data selected by the selecting device.

According to the musical information processing terminal of the first aspect, out of performance data (MD) such as MIDI data and audio data (AD) that represents audio waveforms, that are received by the present musical information processing terminal, such as a terminal for a student (ST), from an external musical information processing terminal, such as a terminal for a teacher (TC), through a communication network (CN), either one type of data is selected as data to reproduced. When the performance data and/or the audio data is received, either the performance data or the audio data that corresponds to the selected data to be reproduced is reproduced. As a result, the performance data and the audio data can be reproduced with a simple construction and without an unnatural feeling being given to users.

Preferably, in the first aspect, the selecting device switches a method of selecting the data from either the performance data or the audio data according to an instruction by a user.

To attain the above object, in a second aspect of the present invention, there is provided musical information processing terminal comprising a performance data generating device that generates performance data that instructs generation and control of musical tones, an audio data generating device that generates audio data that represents audio waveforms, a transmitting device that transmits the performance data or the audio data to an external musical information processing terminal through the communication network, and a selecting device that selects data to be transmitted to the external musical information processing terminal either from the performance data or from the audio data, wherein the data to be transmitted by the transmitting device is determined according to the data generated by the performance data generating device and the audio data generating device, and the data selected by the selecting device.

According to the second aspect, out of performance data (MD) and audio data (AD) that are transmitted from the present musical information processing terminal, such as a terminal for a teacher (TC), to an external musical information processing terminal, such as a terminal for a student (ST), through a communication network (CN), either the performance data or the audio data is selected as data to be transmitted. The performance data or the audio data is that corresponds to the selected data to be transmitted is transmitted. As a result, also in the second aspect, the performance data or the audio data can be reproduced at the external musical information processing terminal to which the data has been transmitted, with a simple configuration and without an unnatural feeling being given to users.

Preferably, in the second aspect, the selecting device switches a method of selecting the data from either the performance data or the audio data according to an instruction by a user.

To attain the above object, in a third aspect of the present invention, there is provided a control method comprising a receiving step of receiving at least one of performance data that instructs generation and control of musical tones and audio data that represents audio waveforms, from an external musical information processing terminal through the communication network, a reproducing step of reproducing the performance data or the audio data, and a selecting step of selecting data to be reproduced in the reproducing step either from the performance data or from the audio data, wherein the data to be reproduced in the reproducing step is determined according to the data received in the receiving step and the data selected in the selecting step.

To attain the above object, in a fourth aspect of the present invention, there is provided a control method comprising a performance data generating step of generating performance data that instructs generation and control of musical tones, an audio data generating step of generating audio data that represents audio waveforms, a transmitting step of transmitting the performance data or the audio data to an external musical information processing terminal through the communication network, and a selecting step of selecting data to be transmitted to the external musical information processing terminal either from the performance data or from the audio data, wherein the data to be transmitted in the transmitting step is determined according to the data generated in the performance data generating step and the audio data generating step, and the data selected in the selecting step.

To attain the above object, in a fifth aspect of the present invention, there is provided a program comprising a receiving module for receiving at least one of performance data that instructs generation and control of musical tones and audio data that represents audio waveforms, from an external musical information processing terminal through the communication network, a reproducing module for reproducing the performance data or the audio data, and a selecting module for selecting data to be reproduced in the reproducing step either from the performance data or from the audio data, wherein the data to be reproduced by the reproducing module is determined according to the data received by the receiving module and the data selected by the selecting module.

To attain the above object, in a sixth aspect of the present invention, there is provided a program comprising a performance data generating module for generating performance data that instructs generation and control of musical tones, an audio data generating module for generating audio data that represents audio waveforms, a transmitting module for transmitting the performance data or the audio data to an external musical information processing terminal through the communication network, and a selecting module for selecting data to be transmitted to the external musical information processing terminal either from the performance data or from the audio data, wherein the data to be transmitted by the transmitting module is determined according to the data generated by the performance data generating module and the audio data generating step, and the data selected by the selecting module.

The above and other objects, features, and advantages of the invention will become more apparent from the following detailed description taken in conjunction with the accompanying drawings.

DETAILED DESCRIPTION OF THE PREFERRED EMBODIMENTS

The present invention will be described below in detail with reference to the accompanying drawings showing preferred embodiments thereof.

Figure 1:
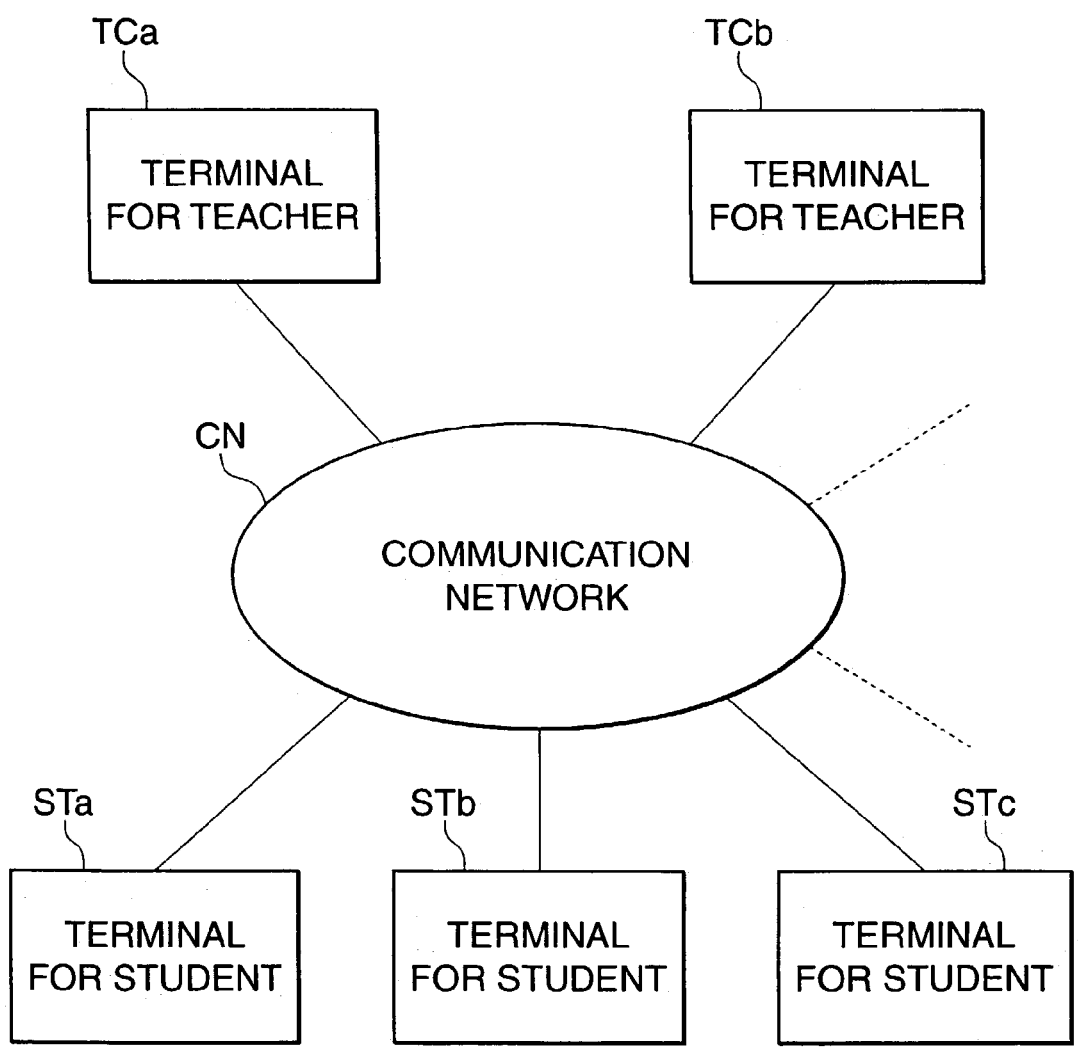
FIG. 1 is a schematic diagram showing the entire construction of a musical information reproducing system which is comprised of musical information processing terminals according to a first embodiment of the present invention.

FIG. 1 is a schematic diagram showing the entire construction of a musical information reproducing system which is comprised of musical information processing terminals according to a first embodiment of the present invention. In FIG. 1, the musical information reproducing system is comprised of a plurality of terminals for teachers TCa, TCb, . . . , and a plurality of terminals for students STa, STb, STc, . . . . The terminals for teachers TCa, TCb, . . . and the terminals for students STa, STb, STc, . . . can communicate with each other through a communication network CN such as the Internet or a local area network (LAN). In the following description, symbol "TC" generically designates the individual terminals for the teachers TCa, TCb, . . . , and symbol "ST" generically designates the individual terminals for students STa, STb, STc, . . . .

The terminals for teachers TC each generate performance data based on performance of an electronic musical instrument, not shown, for example, such as MIDI data, represented in a predetermined format, that is comprised of instructions for causing a tone generator to reproduce musical tones generated by performance of the musical instrument, or generates audio data that is represented by waveforms of audio signals that are input from a microphone, not shown, as discrete value information. Further, the terminals for teachers TC are each provided with a function of generating video data from image pickup signals from a camera, not shown. These data are transmitted to terminals for students ST through the communication network CN to be reproduced by the terminals for students ST. That is, the terminal for the teacher TC generates plurality kinds of musical information which are different in data format and reproducing method, such as performance data and audio data, and transmits them to the terminals for students ST. As is well known, the MIDI data has a data structure in which various event data (note on, note off, program change, control change, and so on) for instructing a tone generator to generate and control musical tones are arranged in the order of the progress of performance. On the other hand, the audio data has a data structure (digital waveforms) in which discrete values generated by sampling continuous audio waveforms (analog waveforms) of musical tones and/or speeches are arranged in time series.

With the arrangement of FIG. 1, when a teacher who uses a terminal for a teacher TC speaks to give comments or actually performs the electronic musical instrument for musical instructions, not only speech of comments but also performance sound based on the actual performance of the electronic musical instrument are input to the microphones so that performance data based on the actual performance of the electronic musical instrument and audio data are generated by the terminal for the teacher TC.

Figure 2:
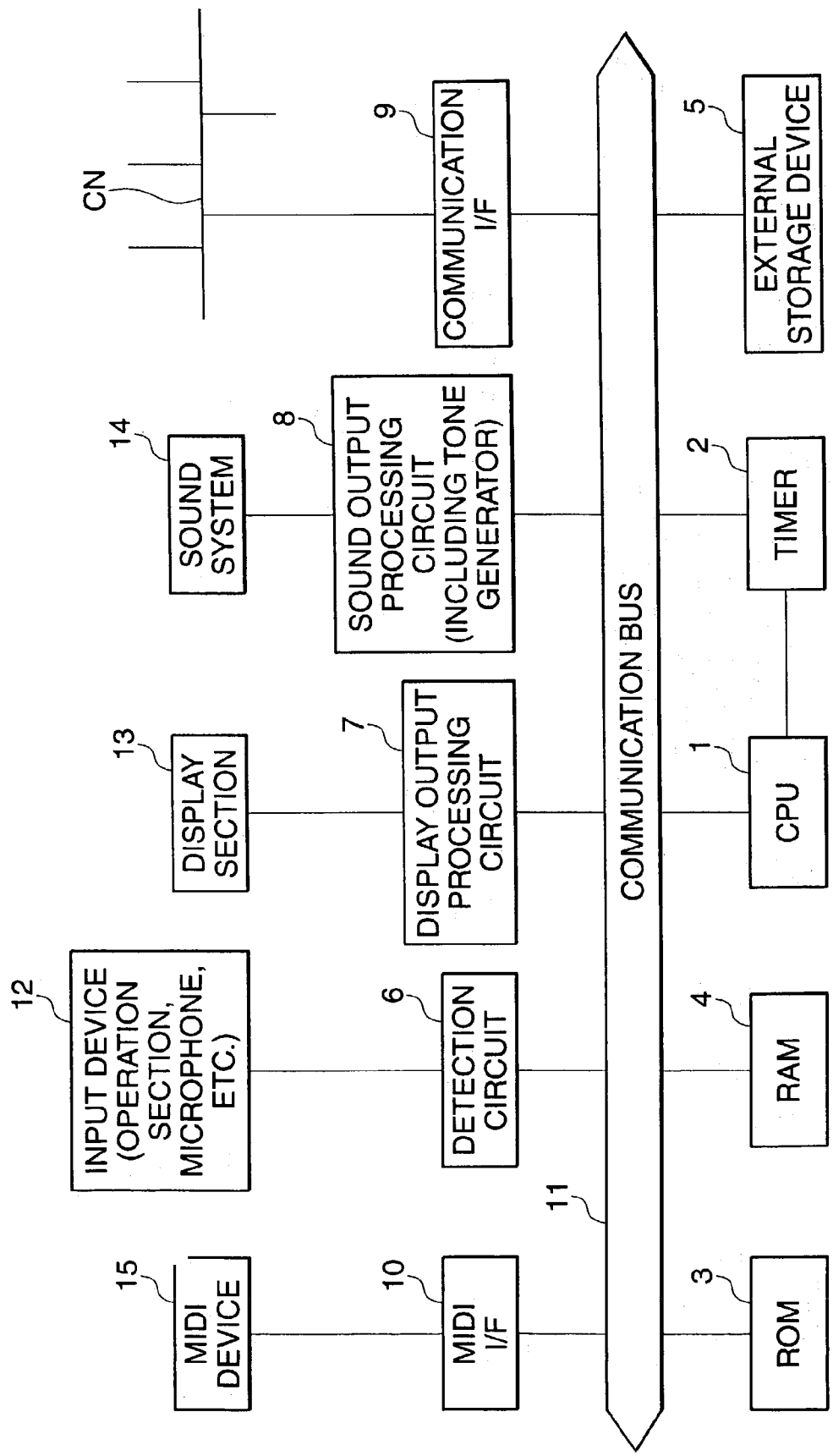
FIG. 2 is a block diagram showing the hardware construction of each musical information processing terminal of the musical information reproducing system in FIG. 1.

FIG. 2 is a block diagram showing the hardware configuration of each musical information processing terminal of the musical information reproducing system in FIG. 1. In the present system, personal computers having a communication function are used as main body devices of the terminals for teachers TC and the terminals for students ST, and these personal computers are provided with a musical information processing function of generating and reproducing performance data and audio data. Alternatively, musical information processing devices dedicated to performance data such as electronic musical instruments may be used as the main body devices, and these electronic musical instruments may be provided with a communication function and a function of generating and reproducing performance data and audio data.

The terminals for teachers TC and the terminals for students ST are each comprised of a central processing unit (CPU) 1, a timer 2, a read only memory (ROM) 3, a random access memory (RAM) 4, an external storage device 5, a detection circuit 6, a display output processing circuit 7, and a sound output processing circuit 8, and is also comprised of a communication interface (communication I/F) 9, a MIDI interface (MIDI I/F) 10, and these elements 1 to 10 are connected to each other through a communication bus 11.

The CPU 1, which controls the entire terminal, uses a clock from the timer 2 based on software programs to perform various controls of, for example, generation and reproduction of performance data and reproduction switching process for switching between transmission and reproduction of performance data and audio data. The ROM 3 stores various control programs that execute a musical information process and a reproduction switching process, which are fundamental to the system, and various associated data and tables. The RAM 4 temporarily stores information such as flags and buffers used in execution of these processes.

The external storage device 5 is comprised of a hard disk drive (HDD), or a storage medium such as a compact disk read only memory (CD-ROM), a flexible disk (FD), a magneto-optical (MO) disk, a digital versatile disk (DVD), a memory card, and a driving unit therefor, and can store various control programs and various data. Programs and various tables required for the reproduction switching process and the like are not only read from the ROM 3 into the RAM 4, but also may be read from the external storage device 5 into the RAM 4. For example, software for a variety of information processing including the reproduction switching process can be installed on the HDD.

An input device 12 is connected to the detection circuit 6. The input device 12 includes an operating unit comprised of operating elements such as a keyboard and a pointing device (a mouse or the like), and when a user operates any of the operating elements of the operating unit, the detection circuit 6 detects the content of the operation by the user to capture the content into the present terminal. The operating elements operated by the user include, for example, "talk switches (SWA, SWa)" or "auto switches (SWB, SWb)", and the user manually sets data to be reproduced or transmitted by or from the terminal using the talk switches, and automatically set the data using the auto switches.

In addition to the operating unit, the input device 12 includes an audio input device such as a microphone, and a video input device such as an electronic video camera. For example, on the side of the terminal for the teacher TC, user's (teacher's) speech of musical instructions can be input as an audio signal using the microphone, or a video image (dynamic image) that shows the user's (teacher's) performance can be input as a video signal using the electronic video camera. As described above, the detection circuit 6 not only detects the contents of operations by the operating elements, but also analog-to-digital (A/D) converts audio signals from the audio input device and detects video signals from the video input device to capture audio data and video data corresponding to the audio signals and the video signals into the present terminal.

The display output processing circuit 7 controls display contents on a display section 13 connected thereto according to instructions from the CPU 1, assists information input and operation checking by displaying various screen images on the display section 13 according to operations by the input device 12, and further displays video images based on video data.

The sound output processing circuit 8 is comprised of a tone generator, an effect circuit for performance data, composed of a DSP (Digital Signal Processor) or the like, and an audio data processing circuit, and is connected to a sound system 14 composed of a D/A converter, an amplifier, and a speaker. The sound output processing circuit 8 generates performance output signals based on performance data and audio output signals based on audio data to be sounded by the sound system 14.

Connected to the communication I/F 9 is the communication network CN such as a local area network (LAN), the Internet, or a telephone line, and thus the present terminal can communicate with other terminals (TC, ST) or with another server computer through the communication network. For example, the present terminal can receive performance data, audio data, and video data from other terminals (TC, ST), and download control programs and various data such as performance data from another server computer to store them in the external storage device 5. For example, on the side of each of the terminals for students ST, the terminal can display a video image a teacher' performance, based on video data received through the communication I/F 9 and the communication network CN from a terminal for the teacher TC, through a display output section 7-13 comprised of the display output processing circuit 7 and the display section 13.

Further, an electronic musical instrument (MIDI device) 15 having a performance data generation source that can generate performance data based on an actual performance is connected to the MIDI I/F 10. The electronic musical instrument can transmit and receive performance data in the MIDI format. Thus, each terminal TC and each terminal ST can actually perform the electronic musical instrument 15, and cause a sound output section 8-14 comprised of the sound output processing circuit 8 and the sound system to sound musical tones based on the performance.

With the above configuration of each terminal, on the side of a terminal for the teacher TC, for example, performance data based on the teacher's actual performance using the electronic musical instrument 15 can be captured into the present terminal through the MIDI I/F 10, and data of a model performance can be read into the RAM 4 from the external storage device 5, so that musical tones based on the performance data can be converted into actual sounds by the sound output section 8-14. In this case, if the performance data is transmitted to a terminal for a student ST through the communication I/F 9 and the communication network CN, musical tones based on the received performance data can be reproduced by the sound output section 8-14 on the side of the terminal for the student ST.

Specifically, on the side of the terminal for the teacher TC, the musical tones sounded by the sound output section 8-14 is input through the microphone of the input device 12 as an audio signal. The input audio signal is converted into audio data by an audio data input processing function of an information input section 12-6 comprised of the input device 12 and the detection circuit 6, and the audio data is transmitted to the terminals for students ST through the communication I/F 9 and the communication network CN. On the side of the terminals for students ST, musical tones based on the received audio data are reproduced by the sound output section 8-14.

A dedicated video processing circuit may be provided as necessary for a video data processing function of the information input section 12-6 through the display output section 7-13 such that the CPU 1 controls the video processing circuit. Also, a dedicated audio processing circuit may be provided as necessary for an audio data processing function of the information input section 12-6 through the sound output section 8-14 such that the CPU 1 controls the audio processing circuit.

Further, the video processing function and/or the audio processing function of the information input section 12-6, the display output section 7-13, and the sound output section 8-14 described above may be omitted as necessary based on functions required by the present terminal. For example, for terminals for students ST, functions involved in input processing of audio signals and video signals from the information input section 12-6 may be omitted.

In the musical information reproducing system according to the first embodiment of the present invention, on the side of terminals for students ST, either performance data MD or audio data AD can be switched for use as an object to be reproduced by operating the talk switch (SWA). When the performance data MD and the audio data AD are received from an external terminal for a teacher TC through the communication network CN, data of the object to be reproduced, out of the received data MD and AD, is reproduced.

Figure 3:
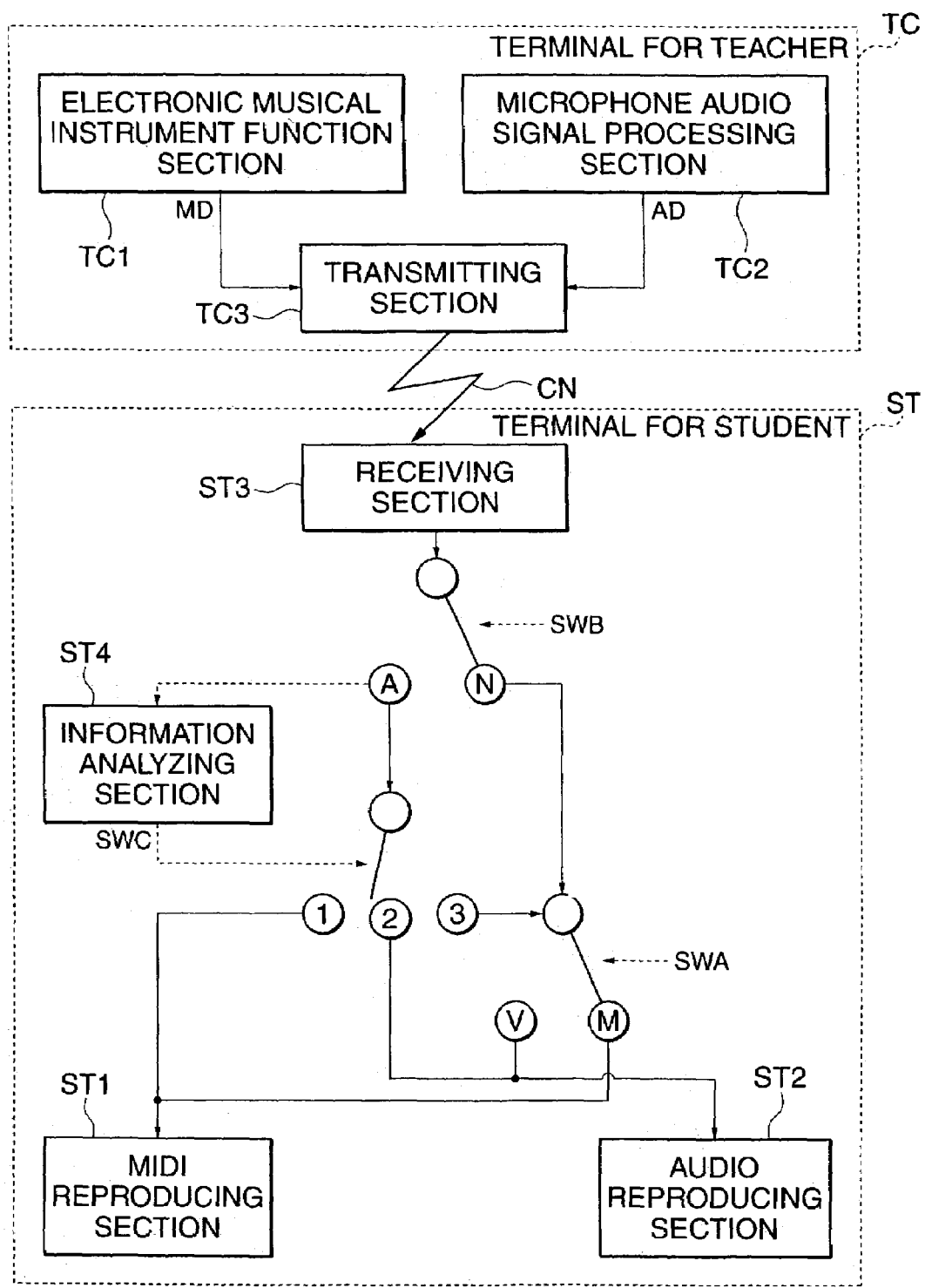
FIG. 3 is a block diagram useful in explaining functions of the musical information reproducing system in FIG. 1.

FIG. 3 is a block diagram useful in explaining functions of the musical information reproducing system in FIG. 1. As shown in FIG. 3, the terminals for teachers TC (TCa, TCb, . . . ) are each provided with an electronic musical instrument function section TC1, a microphone audio signal processing section TC2, and a transmitting section TC3, and the terminals for students ST (STa, STb, STc, . . . ) are each provided with a MIDI reproducing section ST1 that corresponds to the electronic musical instrument function section TC1 of the terminals for teachers TC, an audio reproducing section ST2 that corresponds to the microphone audio processing section TC2 of the terminals for teachers TC, and a receiving section ST3.

The electronic musical instrument function section TC1 of each of the terminals for teachers TC is a function block that generates, for example, performance data (MIDI data) MD in the MIDI format based on an actual performance using the electronic musical instrument 15 that is connected to the main body of the terminal for the teacher TC through the MIDI I/F 10, or capture performance MD stored in the ROM 3 or the external storage device 5. The microphone audio signal processing section TC2 is a function block that converts speech of the user (teacher) of the terminal for the teacher TC or sounds generated by the sound output section 8-14 based on performance data into audio data (waveform data) AD by the audio data input processing function of the information input section 12-6. The transmitting section TC3 transmits performance data MD and audio data AD respectively generated by the blocks TC1 and TC2 to each of the terminals for students ST through the communication network CN.

A receiving section ST3 of each of the terminals for students ST receives the performance data MD and the audio data AD from the terminal for the teacher TC and delivers the data to a MIDI reproducing section ST1 and an audio reproducing section ST2, respectively. The MIDI reproducing section ST1 and the audio reproducing section ST2 sound musical tones and audio sound based, respectively, on the received performance data MD and audio data AD through the sound output section 8-14.

According to the present embodiment, in addition to the above-described construction, each terminal for the teacher TC (server) transmits all performance data MD and/or audio data AD generated on the side of the terminal TC to the terminals for students ST according to a reproduction switching program (1), and the terminals for students ST each receive the performance data MD and/or the audio data AD and reproduce the data according to the type of the received data and reproduction settings made by various switches at the terminal for the student ST. To this end, the terminals for students ST are each provided with the talk switch SWA, auto switch SWB, a selecting switch SWC, and an information analyzing section ST4.

The talk switch SWA is a switching function section operated by a user (student) to switch data to be reproduced by the terminal for the student ST, to either performance data MD or audio data AD, that is, select either the performance data MD or the audio data AD. For example, the talk switch SWA is set in an "OFF" state (position "M") as its initial state, as shown in FIG. 3, to instruct reproduction of the performance data MD. When the user operates the talk switch SWA from the illustrated state, the talk switch SWA is changed into an "ON" state (position "V"), also shown in the figure, to instruct reproduction of the audio data AD. The talk switch SWA is switched in position by each operation by the user in the order of position "M" (OFF)→position "V" (ON)→position "M" (OFF)→ . . . .

The auto switch SWB is a switching function section that switches (selects) a mode (N) in which the selection of data to be reproduced at the terminal for the student ST is determined by the set state of the talk switch SWA and a mode (A) in which the selection is automatically determined according to the type of the received data. For example, the talk switch SWB is set in an "OFF" state (position "N") as its initial state, as shown in FIG. 3, so that the selection of data to be reproduced at the terminal for the student ST is determined by the set state of the talk switch SWA, that is, the instruction of the talk switch SWA for selecting data to be reproduced is made effective. When the user (student) operates the talk switch SWB from the illustrated initial state, the switch SWB is changed into an "ON" state (position "A"), also shown in the figure, so that the data received by the receiving section ST3 is delivered to the information analyzing section ST4 to select the data to be reproduced, in dependence on a result of analysis of the data by the information analysis section 4. The auto switch SWB is switched in position by each operation by the user in the order of position "N" (OFF)→ position "A" (ON)→position "N" (OFF)→ . . . .

The information analyzing section ST4 analyzes the received data to determine whether the data is (1) performance data MD, (2) audio data AD, or (3) data containing the both data, and controls the selecting switch SWC according to a result of the analysis. The selecting switch SWC is a switching function section that switches connection of the route of data to one of the routes (1) to (3) shown in FIG. 3 according to an output of the result of the analysis from the information analyzing section ST4. That is, the selecting switch SWC is used to select a section to which the received data is to be delivered upon receipt when the auto switch SWB is in the ON state (position "A"), from (1) the MIDI reproducing section ST1, (2) the audio reproducing section ST2, or (3) either the reproducing section ST1 or ST2 that corresponds to the set state of the talk switch SWA, according to the result of the analysis.

Figure 4:
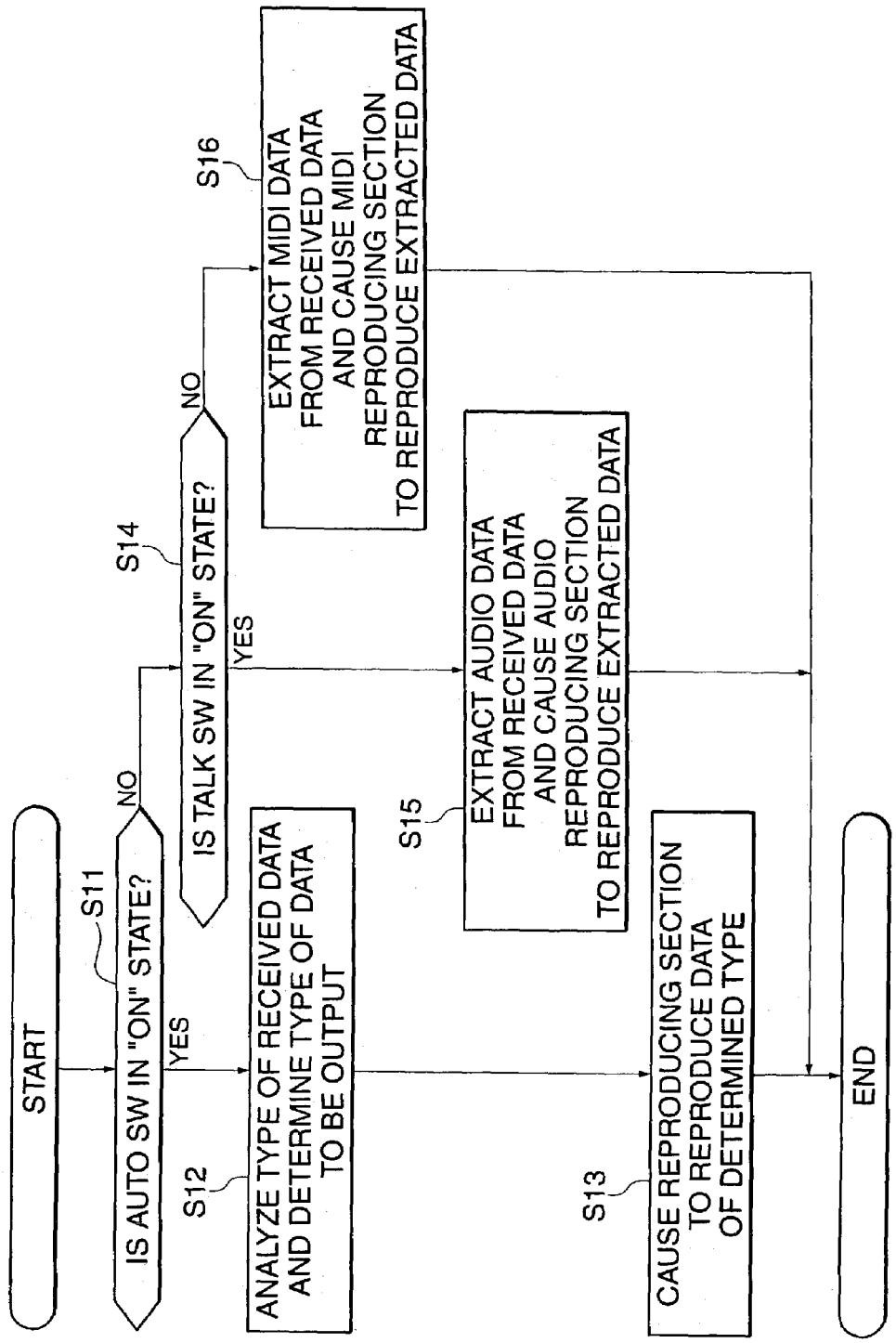
FIG. 4 is a flowchart showing the reproduction switching process carried out by each of the terminals for students of the musical information reproducing system in FIG. 1.

FIG. 4 is a flowchart showing the reproduction switching process carried out by each of the terminals for students of the musical information reproducing system in FIG. 1. In the present embodiment, the operation of the reproduction switching process (1) as shown in FIG. 4 is started according to the reproduction switching program (1) each time data is received by the terminal for the student ST.

When the reproduction switching process (1) starts, first in step S11, it is determined whether the auto switch SWB is in the "ON" state (A). If it is determined that the auto switch SWB is in the "ON" state (YES in the step S11), then the process proceeds to step S12, where the type of the data received by the receiving section ST3 is analyzed by the information analyzing section ST4 to determine the type of the data to be output from the receiving section 3. Then, in step S13, the selecting switch SWC is switched to such a state that the data is reproduced by the reproducing section ST1 or ST2 that corresponds to the type of the data as a result of the above analysis, and the reproduction of the data is carried out by the reproduction section ST1 or ST2 selected by the switching of the selecting switch SWC. Then, the present reproduction switching process is terminated.

If it is determined in the step S11 that the auto switch SWB is in the "OFF" state (N) (NO in the step S11), then the process proceeds to step S14, where it is determined whether the talk switch SWA is in the "ON" state (V). If it is determined that the talk switch SWA is in the "ON" state (YES in the step S14), then the process proceeds to step S15 to extract audio data AD from the received data and reproduce the audio data by the audio reproducing section ST2, and the reproduction switching process (1) is terminated. If it is determined in the step S11 that no audio data AD is contained in the received data, then the reproduction switching process (1) is terminated without carrying out the reproduction by the audio reproducing section ST2.

If it is determined in the step S14 that that the talk switch SWA is in the "OFF" state (M) (NO in the step S14), then the process proceeds to step S16 to extract performance data (MIDI data) MD from the received data and reproduce the performance data by the MIDI reproducing section ST1, and the reproduction switching process (1) is terminated. In step S16, if no performance data MD is contained in the received data, then the reproduction switching process (1) is terminated without carrying out the reproduction by the MIDI reproducing section ST1.

Next, a description will be given of a musical information reproducing system according to a second embodiment of the present invention. In the second embodiment, in each of the terminals for teachers TC, either performance data MD or audio data AD can be switched or selected for use as an object to be transmitted by operation of the talk switch SWa, and data of the object to be transmitted, out of the performance data MD and the audio data AD generated by the terminal for the teacher TC, is transmitted to the terminals for students ST.

Figure 5:
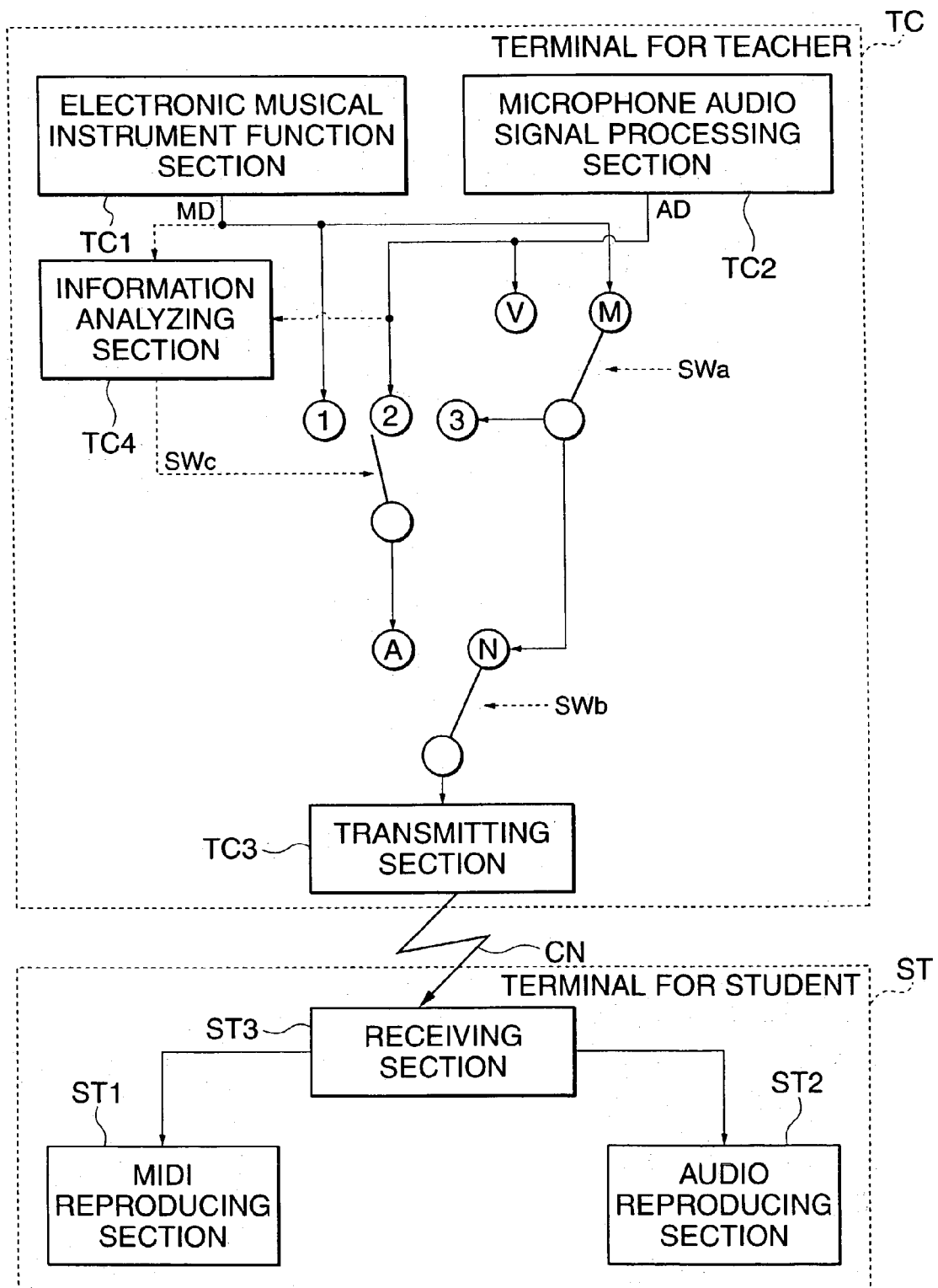
FIG. 5 is a block diagram useful in explaining functions of a musical information reproducing system according to a second embodiment of the present invention.

FIG. 5 is a block diagram useful in explaining functions of the musical information reproducing system according to the present embodiment. As shown in FIG. 5, terminals for teachers TC (TCa, TCb, . . . ) are each provided with an electronic musical instrument function section TC1, a microphone audio signal processing section TC2, a transmitting section TC3, and an information analyzing section TC4. Terminals for students ST (STa, STb, STc, . . . ) are each provided with a MIDI reproducing section ST1 that corresponds to the electronic musical instrument function section TC1, an audio reproducing section ST2 that corresponds to the microphone audio processing section TC2, and a receiving section ST3.

In the present embodiment, switching control is performed by each terminal for the teacher TC (server) according to a reproduction switching program (2) to select either performance data MD or audio data AD generated by the terminal for the teacher TC and transmit the selected data to the terminals for students ST. On the other hand, each of the terminals for students ST reproduces all of performance data MD and/or audio data AD received from the terminal for the teacher TC. To this end, each terminal for the teacher TC is provided with the talk switch SWa, an auto switch SWb, a selecting switch SWc, and an information analyzing section TC4.

The talk switch SWa is a switching function section operated by a user (teacher) to switch data to be transmitted from the terminal for the teacher TC to either performance data MD or audio data AD, that is, select either the performance data MD or the audio data AD. For example, the talk switch SWa is set in an "OFF" state (position "M") as its initial state, as shown in FIG. 5, to instruct transmission of the performance data MD. When the user operates the talk switch SWa from the illustrated state, the talk switch SWa is changed into an "ON" state(position "V"), also shown in the figure, to instruct transmission of the audio data AD. The talk switch SWa is switched in position by each operation by the user in the same manner as the talk switch SWA of the first embodiment.

The auto switch SWb is a switching function section that switches (selects) a mode (N) in which the selection of data to be transmitted the terminal for the teacher TC is determined by the set state of the talk switch SWa and a mode (A) in which the selection is automatically determined according to the type of the data that has been generated. For example, the talk switch SWb is set in an "OFF" state (position "N") as its initial state, as shown in FIG. 5 so that the selection of data to be transmitted from the terminal for the teacher TC is determined by the set state of the talk switch SWa, that is, the instruction of the talk switch SWa for selecting data to be transmitted is made effective. When the user operates the talk switch SWb from the illustrated initial state, the switch SWb is changed into an "ON" state (position "A"), also shown in the figure, so that the instruction of the selecting switch SWc for selecting data to be transmitted is made effective. The auto switch SWb is also switched in position by each operation by the user in the same manner as the talk switch SWa.

The selecting switch SWc is an auto switch function section that switches the transmission route, which represents the type of the data to be transmitted, between a plurality of routes (switch positions) (1) to (3) as shown in FIG. 5 according to a result of analysis by the information analysis section TC4. The information analysis section TC4 that outputs the result of the analysis receives performance data MD generated by the electronic musical instrument function section TC1 and audio data AD generated by the microphone audio signal processing section TC2 to determine the type of the data generated by the terminal for the teacher TC. That is, the information analysis section TC4 analyzes which of (1) performance data MD, (2) audio data AD, or (3) data containing the both data has been, and switches the selecting switch SWc to one of the routes (1) to (3) according to the result of the analysis.

In other words, the selecting switch SWc, switches a generation source of data to be transmitted from the transmitting section TC3 when the auto switch SWb is in the "ON" ((A) side) state, between (1) the electronic musical instrument function section TC1, (2) the microphone audio signal processing section TC2, or (3) either the section TC1 or the section TC2 that corresponds to the set state of the talk switch SWa, according to the result of the analysis of the data type from the information analyzing section TC4.

Figure 6:
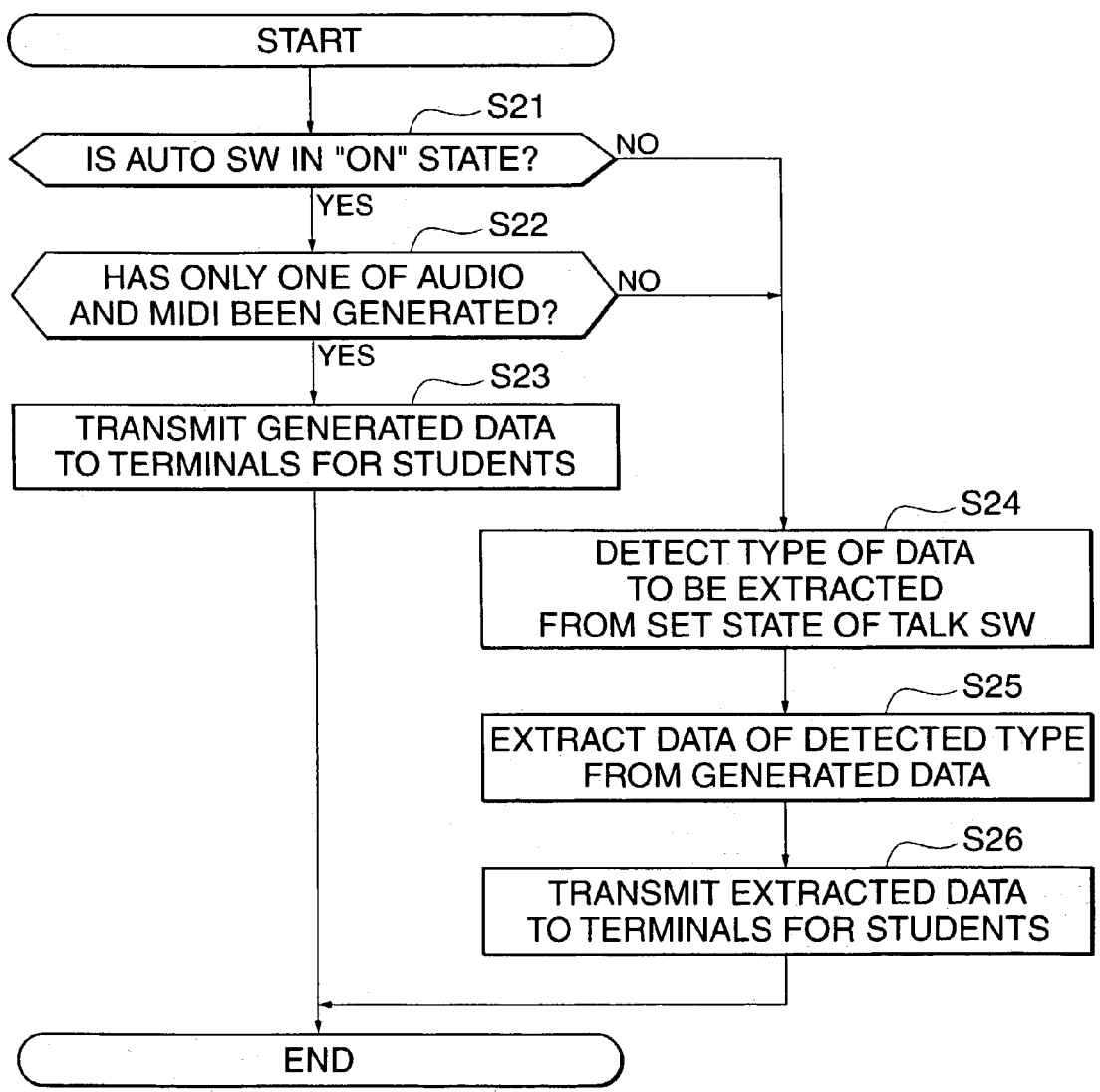
FIG. 6 is a flowchart showing a reproduction switching process carried out by each of the terminals for the teachers of the musical information reproducing system in FIG. 5.

FIG. 6 is a flowchart showing a reproduction switching process carried out by each of the terminals for the teachers TC of the musical information reproducing system in FIG. 5. In the present embodiment, the operation of the reproduction switching process (2) as shown in FIG. 6 is started according to the reproduction switching program (2) each time data is generated by the terminal for the teacher TC.

When the reproduction switching process (2) starts, first in step S21, it is determined whether the auto switch SWb is in the "ON" state (A). If it is determined that the auto switch SWB is in the "ON" state (YES in the step S21), then the process proceeds to step S22, where the information analyzing section TC4 analyzes the type of the data that has been input thereto to determine whether the data generated by the terminal for the teacher TC is only one of performance data (MIDI data) MD and audio data (waveform data) AD or both.

If it is determined in the step S22 that only one of performance data MD and audio data AD has been generated (YES in the step S22), then the process proceeds to step S23, where the selecting switch SWc is switched to the transmission route (1) or (2) to transmit the generated data (performance data MD or audio data AD) to the terminals for students ST, and then the reproduction switching process (2) is terminated.

If it is determined in the step S21 that the auto switch SWb is in the "OFF" state (N) (NO in the step S21), or if it is determined in the step S22 that both performance data MD and audio data AD have been generated (NO in the step S22), then the process proceeds to step S24 to detect the type of data to be extracted from the performance data MD and the audio data AD according to the set state of the talk switch SWa. In the next step S25, data of the type detected in step S24 is extracted from the generated data. Then, in step S26, the extracted data is transmitted to the terminals for students ST under the control of the transmitting section TC3, and then the reproduction switching process (2) is terminated. If it is determined in the step S25 that no data of the type detected in step S24 is contained in the generated data, then the reproduction switching process (2) is terminated without carrying out the operation of extracting data of the detected type, and without transmitting data of the detected type in the step S26.

The present invention is not limited to the above-described first and second embodiments, and may be implemented in a variety of forms. For example, although in the both embodiments, when the auto switch is in the "ON" state (position "A") and the selecting switch selects the option (3) to select the type of data to be reproduced or transmitted in dependence on the set state of the talk switch, another method which does not refer to the set state of the talk switch may be employed to select data to be reproduced or transmitted. For example, the following method may be employed:

(1) To select data that has just been reproduced or generated;

(2) To select data that has not just been reproduced or generated;

(3) To select data having a louder volume; or (4) To receive information indicative of the type of data to be reproduced, from the terminals for teachers TC, or to receive information indicative of the type of data to be transmitted, from the terminals for students ST.

Further, for each of a plurality of terminals for the teacher TCa, TCb, . . . , and for each of a plurality of terminals for students Sta, STb, STc, . . . , setting may be carried out specific to each terminal, using the auto switch SWb or SWB and the talk switch SWa or SWA.

It is to be understood that the object of the present invention may also be accomplished by supplying a system or an apparatus with a storage medium in which a program code of software which realizes the functions of the above described embodiment is stored, and causing a computer (or CPU or MPU) of the system or apparatus to read out and execute the program code stored in the storage medium.

In this case, the program code itself read from the storage medium realizes the functions of the embodiments described above, and hence the storage medium on which the program code is stored constitutes the present invention.

Examples of the storage medium for supplying the program code include a floppy (registered trademark) disk, a hard disk, an optical disk, a magnetic-optical disk, a CD-ROM, a CD-R, a CD-RW, DVD-ROM, a DVD-RAM, a DVD-RW, a DVD+RW, a magnetic tape, a nonvolatile memory card, and a ROM.

Further, it is to be understood that the functions of the above described embodiment may be accomplished not only by executing a program code read out by a computer, but also by causing an OS (operating system) or the like which operates on the computer to perform a part or all of the actual operations based on instructions of the program code. Further, it is to be understood that the functions of the above described embodiment may be accomplished by writing a program code read out from the storage medium into an expansion board inserted into a computer or a memory provided in an expansion unit connected to the computer and then causing a CPU or the like provided in the expansion board or the expansion unit to perform a part or all of the actual operations based on instructions of the program code.

What is claimed is:

1. A reproduction switching device for use in a musical information processing terminal which is capable of receiving performance data that represents musical tones in a predetermined format and audio data that represents audio waveforms from an external musical information processing terminal via a communication network, comprising:
- a first switching device that gives a switching instruction for selecting data to be reproduced either from the performance data or from the audio data;
- a receiving device that receives the performance data or the audio data from the external musical information processing terminal;
- a data determining device that determines which type of data, performance data or audio data, said receiving device has received;
- a second switching device that gives a switching instruction for specifying whether or not a result of determination by said data determining device should be made effective;
- a setting device that sets either the performance data or the audio data having been selected by said first switching device, as the data to be reproduced, when said second switching device has given the switching instruction specifying that the result of determination by said data determining device should not be made effective, and sets, on the basis of the type of data having been determined by said data determining device, either the performance data or the audio data, as the data to be reproduced, when said second switching device has given the switching instruction specifying that the result of determination by said data determining device should be made effective; and
- a reproducing device that reproduces data having been set by said setting device, as the data to be reproduced, from among either the performance data or the audio data that has been received by said receiving device.

2. A musical information processing terminal according to claim 1, wherein said selecting device switches a method of selecting the data from either the performance data or the audio data according to an instruction by a user.

3. A transmission switching device for use in a musical information processing terminal, which is capable of transmitting performance data that represents musical tones in a predetermined format and audio data that represents audio waveforms to an external musical information processing terminal, via a communication network, comprising:
- a first switching device that gives a switching instruction for selecting data to be transmitted either from the performance data or from the audio data;
- a performance data generating device that generates the performance data;
- an audio data generating device that generates the audio data;
- a data determining device that determines which type of generated data, performance data or audio data, is generated by said performance data generating device and said audio data generating device;
- a second switching device that gives a switching instruction for specifying whether or not a result of determination by said data determining device should be made effective;
- a setting device that sets either the performance data or the audio data having been selected by said first switching device, as the data to be transmitted, when said second switching device has given the switching instruction specifying that the result of determination by said data determining device should not be made effective, and sets, on the basis of the type of generated data having been determined by said data determining device, either the performance data or the audio data, as the data to be transmitted, when said second switching device has given the switching instruction specifying that the result of determination by said data determining device should be made effective; and
- a transmitting device that transmits data having been set by said setting device, as the data to be transmitted, from among either the performance data or the audio data that has been received by said receiving device, to the external musical information processing terminal.

4. A musical information processing terminal according to claim 3, wherein said selecting device switches a method of selecting the data from either the performance data or the audio data according to an instruction by a user.

5. A control method for controlling a musical information processing terminal that can be connected to a communication network, comprising:
- a first switching instruction step of giving a first switching instruction for selecting data to be reproduced either from the performance data or from the audio data;
- a receiving step of receiving at least one of performance data that instructs generation and control of musical tones and audio data that represents audio waveforms, from an external musical information processing terminal through the communication network;
- a data determining step of determining which type of data, performance data or audio data, said receiving device has received;
- a second switching instruction step of giving a switching instruction for specifying whether or not a result of determination by said data determining device should be made effective;
- a setting step of setting either the performance data or the audio data having been selected by said first switching step, as the data to be reproduced, when said second switching step has given the switching instruction specifying that the result of determination by said data determining step should not be made effective, and sets, on the basis of the type of data having been determined by said data determining step, either the performance data or the audio data, as the data to be reproduced, when said second switching step has given the switching instruction specifying that the result of determination by said data determining step should be made effective; and
- a reproducing step of reproducing data having been set by said setting step, as the data to be reproduced, from among either the performance data or the audio data that has been received by said receiving device.

6. A control method controlling a musical information processing terminal that can be connected to a communication network, comprising:
- a first switching step of giving a switching instruction for selecting data to be transmitted either from the performance data or from the audio data;
- a performance data generating step of generating performance data that instructs generation and control of musical tones;
- an audio data generating step of generating audio data that represents audio waveforms;
- a data determining step that determines which type of generated data, performance data or audio data, is generated by said performance data generating step and said audio data generating step;
- a second switching step of giving a switching instruction for specifying whether or not a result of determination by said data determining step should be made effective;
- a setting step of setting either the performance data or the audio data having been selected by said first switching step, as the data to be transmitted, when said second switching step has given the switching instruction specifying that the result of determination by said data determining step should not be made effective, and sets, on the basis of the type of generated data having been determined by said data determining step, either the performance data or the audio data, as the data to be transmitted, when said second switching step has given the switching instruction specifying that the result of determination by said data determining steP should be made effective; and;

a transmitting step that transmits data having been set by said setting step, as the data to be transmitted, from among either the performance data or the audio data that has been received by said receiving step, to the external musical information processing terminal.

7. A program for executing a control method for controlling a musical information processing terminal which is capable of receiving performance data that represents musical tones in a predetermined format and audio data that represents audio waveforms from an external musical information processing terminal via a communication network, comprising:

a first switching module that gives a switching instruction for selecting data to be reproduced either from the performance data or from the audio data;

a receiving module for receiving the performance data or the audio data from the external musical information processing terminal;

a data determining module that determines which type of data, performance data or audio data, said receiving module has received;

a second switching module that gives a switching instruction for specifying whether or not a result of determination by said data determining module should be made effective;

a reproducing module for reproducing the performance data or the audio data; and a setting module for setting either the performance data or the audio data having been selected by said first switching module, as the data to be reproduced, when said second switching module has given the switching instruction specifying that the result of determination by said data determining module should not be made effective, and sets, on the basis of the type of data having been determined by said data determining module, either the performance data or the audio data, as the data to be reproduced, when said second switching module has given the switching instruction specifying that the result of determination by said data determining module should be made effective; and a reproducing module that reproduces data having been set by said setting module, as the data to be reproduced, from among either the performance data or the audio data that has been received by said receiving module.

8. A program for executing a control method for controlling a musical information processing terminal, which is capable of transmitting performance data that represents musical tones in a predetermined format and audio data that represents audio waveforms to an external musical information processing terminal, via a communication network, comprising:

a first switching module that gives a switching instruction for selecting data to be transmitted either from the performance data or from the audio data;

a performance data generating module for generating the performance data;

an audio data generating module for generating the audio data;

a data determining module that determines which type of generated data, performance data or audio data, is generated by said performance data generating module and said audio data generating module;

a second switching module that gives a switching instruction for specifying whether or not a result of determination by said data determining module should be made effective;

a setting module for setting either the performance data or the audio data having been selected by said first switching module, as the data to be transmitted, when said second switching module has given the switching instruction specifying that the result of determination by said data determining module should not be made effective, and sets, on the basis of the type of generated data having been determined by said data determining module, either the performance data or the audio data, as the data to be transmitted, when said second switching module has given the switching instruction specifying that the result of determination by said data determining module should be made effective; and;

a transmitting module that transmits data having been set by said setting module, as the data to be transmitted, from among either the performance data or the audio data that has been received by said receiving module, to the external musical information processing terminal.

9. A musical information processing terminal according to claim 1, wherein said selecting device includes an information analyzing device that analyzes the data received by said receiving device to determine whether the data is the performance data, or the audio data, or both of the performance data and the audio data, and selects the data to be reproduced by said reproducing device according to a result of the analysis.

10. A musical information processing terminal according to claim 3, wherein said selecting device includes an information analyzing device that analyzes the data generated by the musical information processing terminal to determine whether the data is the performance data, or the audio data, or both of the performance data and the audio data, and selects the data to be transmitted by said transmitting device according to a result of the analysis.

11. A control method for controlling a musical information processing terminal according to claim 5, wherein said selecting device includes an information analyzing device that analyzes the data received by said receiving device to determine whether the data is the performance data, or the audio data, or both of the performance data and the audio data, and selects the data to be reproduced by said reproducing device according to a result of the analysis.

12. A control method controlling a musical information processing terminal according to claim 6, wherein said selecting device includes an information analyzing device that analyzes the data generated by the musical information processing terminal to determine whether the data is the performance data, or the audio data, or both of the performance data and the audio data, and selects the data to be transmitted by said transmitting device according to a result of the analysis.

13. A program for executing a control method for controlling a musical information processing terminal according to claim 7, wherein said selecting device includes an information analyzing device that analyzes the data received by said receiving device to determine whether the data is the performance data, or the audio data, or both of the performance data and the audio data, and selects the data to be reproduced by said reproducing device according to a result of the analysis.

14. A program for executing a control method for controlling a musical information processing terminal according to claim 8, wherein said selecting device includes an information analyzing device that analyzes the data received by said receiving device to determine whether the data is the performance data, or the audio data, or both of the performance data and the audio data, and selects the data to be reproduced by said reproducing device according to a result of the analysis.

* * * * *